(12) United States Patent
Kawasaki

(10) Patent No.: US 12,200,554 B2
(45) Date of Patent: Jan. 14, 2025

(54) BASE STATION, TERMINAL, AND WIRELESS COMMUNICATION SYSTEM

(71) Applicant: FUJITSU LIMITED, Kawasaki (JP)

(72) Inventor: Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 400 days.

(21) Appl. No.: 17/729,247

(22) Filed: Apr. 26, 2022

(65) Prior Publication Data

US 2022/0256418 A1 Aug. 11, 2022

Related U.S. Application Data

(63) Continuation of application No. PCT/JP2019/046676, filed on Nov. 28, 2019.

(51) Int. Cl.
*H04J 4/00* (2006.01)
*H04W 36/08* (2009.01)
(Continued)

(52) U.S. Cl.
CPC ......... *H04W 36/08* (2013.01); *H04W 36/302* (2023.05); *H04W 36/362* (2023.05); *H04W 36/38* (2013.01)

(58) Field of Classification Search
CPC . H04W 36/08; H04W 36/302; H04W 36/362; H04W 36/38; H04W 36/0077; H04W 74/08
(Continued)

(56) References Cited

U.S. PATENT DOCUMENTS

2009/0197605 A1* 8/2009 Kawasaki ............. H04W 52/44
455/437
2010/0080194 A1* 4/2010 Kawasaki ........... H04W 72/542
370/332
(Continued)

FOREIGN PATENT DOCUMENTS

JP 2007-194749 A 8/2007
JP 2019-525626 A 9/2019
(Continued)

OTHER PUBLICATIONS

Notice of Reasons for Refusal issued by the Japan Patent Office for corresponding Japanese Patent Application No. 2021-561088, mailed on Feb. 7, 2023, with an English machine translation.
(Continued)

*Primary Examiner* — Chuong T Ho
(74) *Attorney, Agent, or Firm* — Myers Wolin, LLC

(57) ABSTRACT

A base station includes a receiver and a transmitter. The receiver configured to receive, from a terminal, a handover destination notification including first identification information and second identification information, the first identification information being information for identifying a first base station as a handover destination determined by the terminal, the second identification information being information for identifying a preamble to be transmitted by the terminal to the first base station. The transmitter configured to transmit an advance notification including third identification information and the second identification information to the first base station, the third identification information being information for identifying the terminal.

10 Claims, 8 Drawing Sheets

(51) Int. Cl.
H04W 36/30 (2009.01)
H04W 36/36 (2009.01)
H04W 36/38 (2009.01)

(58) Field of Classification Search
USPC .......................................................... 370/436
See application file for complete search history.

(56) References Cited

U.S. PATENT DOCUMENTS

| | | | |
|---|---|---|---|
| 2010/0240379 | A1 | 9/2010 | Kishiyama et al. |
| 2011/0058529 | A1* | 3/2011 | Uemura ............ H04W 36/0077 370/331 |
| 2012/0170532 | A1* | 7/2012 | Kato ................. H04W 36/0072 370/329 |
| 2013/0260762 | A1* | 10/2013 | Tomita ............... H04W 36/304 455/436 |
| 2014/0126545 | A1 | 5/2014 | Tamura et al. |
| 2017/0215117 | A1* | 7/2017 | Kwon ............... H04W 36/0094 |
| 2020/0068457 | A1* | 2/2020 | You ....................... H04L 1/1819 |
| 2021/0112469 | A1* | 4/2021 | Peng ..................... H04W 40/36 |
| 2021/0211957 | A1* | 7/2021 | Kamohara ............ H04W 36/06 |
| 2021/0297909 | A1* | 9/2021 | Lee ................... H04W 36/0061 |
| 2021/0377830 | A1* | 12/2021 | Jin ..................... H04W 36/085 |

FOREIGN PATENT DOCUMENTS

| | | |
|---|---|---|
| WO | 2013/024574 A1 | 2/2013 |
| WO | 2018/031764 A1 | 2/2018 |

OTHER PUBLICATIONS

International Search Report with the Written Opinion of the International Searching Authority issued by the Japan Patent office for corresponding International Patent Application No. PCT/JP2019/0476676 dated Feb. 18, 2020.
Lenovo et al., "Conditional handover in NR system", Agenda Item 11.9.3, 3GPP TSG-RAN WG2 Meeting #105, R2-1901069, Athens, Greece, Feb. 25-Mar. 1, 2019.
3GPP TS 23.501 V16.1.0, 3rd Generation Partnership Project; Technical Specification Group Services and System Aspects; System Architecture for the 5G System; Stage 2 (Release 16) , Jun. 2019.
3GPP TS 36.133 V16.0.0, 3rd Generation Partnership Project; Technical Specification Group Radio Access Network; Evolved Universal Terrestrial Radio Access (E-UTRA); Requirements for support of radio resource management (Release 16), Dec. 2018.
3GPP TS 36.211 V15.5.0, 3rd Generation Partnership Project; Technical Specification Group Radio Access Network; Evolved Universal Terrestrial Radio Access (E-UTRA); Physical channels and modulation (Release 15), Mar. 2019.
3GPP TS 36.212 V15.5.0, 3rd Generation Partnership Project; Technical Specification Group Radio Access Network; Evolved Universal Terrestrial Radio Access (E-UTRA); Multiplexing and channel coding (Release 15), Mar. 2019.
3GPP TS 36.213 V15.5.0, 3rd Generation Partnership Project; Technical Specification Group Radio Access Network; Evolved Universal Terrestrial Radio Access (E-UTRA); Physical layer procedures (Release 15), Mar. 2019.
3GPP TS 36.214 V15.3.0, 3rd Generation Partnership Project; Technical Specification Group Radio Access Network; Evolved Universal Terrestrial Radio Access (E-UTRA); Physical layer; Measurements (Release 15), Sep. 2018.
3GPP TS 36.300 V15.5.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Mar. 2019.
3GPP TS 36.321 V15.5.0, 3rd Generation Partnership Project; Technical Specification Group Radio Access Network; Evolved Universal Terrestrial Radio Access (E-UTRA); Medium Access Control (MAC) protocol specification (Release 15), Mar. 2019.
3GPP TS 36.322 V15.1.0, 3rd Generation Partnership Project; Technical Specification Group Radio Access Network; Evolved Universal Terrestrial Radio Access (E-UTRA); Radio Link Control (RLC) protocol specification (Release 15), Jul. 2018.
3GPP TS 36.323 V15.3.0, 3rd Generation Partnership Project; Technical Specification Group Radio Access Network; Evolved Universal Terrestrial Radio Access (E-UTRA); Packet Data Convergence Protocol (PDCP) specification (Release 15), Mar. 2019.
3GPP TS 36.331 V15.5.1, 3rd Generation Partnership Project; Technical Specification Group Radio Access Network; Evolved Universal Terrestrial Radio Access (E-UTRA); Radio Resource Control (RRC); Protocol specification (Release 15), Apr. 2019.
3GPP TS 36.413 V15.5.0, 3rd Generation Partnership Project; Technical Specification Group Radio Access Network; Evolved Universal Terrestrial Radio Access Network (E-UTRAN); S1 Application Protocol (S1AP) (Release 15), Mar. 2019.
3GPP TS 36.423 V15.5.0, 3rd Generation Partnership Project; Technical Specification Group Radio Access Network; Evolved Universal Terrestrial Radio Access Network (E-UTRAN); X2 application protocol (X2AP) (Release 15), Mar. 2019.
3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.
3GPP TS 37.324 V15.1.0, 3rd Generation Partnership Project; Technical Specification Group Radio Access Network; E-UTRA and NR; Service Data Adaptation Protocol (SDAP) specification (Release 15), Sep. 2018.
3GPP TS 37.340 V15.5.0, 3rd Generation Partnership Project; Technical Specification Group Radio Access Network; Evolved Universal Terrestrial Radio Access (E-UTRA) and NR; Multi-connectivity; Stage 2 (Release 15), Mar. 2019.
3GPP TS 38.201 V15.0.0, "3rd Generation Partnership Project; Technical Specification Group Radio Access Network; NR; Physical layer; General description (Release 15)", Dec. 2017.
3GPP TS 38.202 V15.4.0, 3rd Generation Partnership Project; Technical Specification Group Radio Access Network; NR; Services provided by the physical layer (Release 15), Dec. 2018.
3GPP TS 38.211 V15.5.0, 3rd Generation Partnership Project; Technical Specification Group Radio Access Network; NR; Physical channels and modulation (Release 15), Mar. 2019.
3GPP TS 38.212 V15.5.0, 3rd Generation Partnership Project; Technical Specification Group Radio Access Network; NR; Multiplexing and channel coding (Release 15), Mar. 2019.
3GPP TS 38.213 V15.5.0, 3rd Generation Partnership Project; Technical Specification Group Radio Access Network; NR; Physical layer procedures for control (Release 15), Mar. 2019.
3GPP TS 38.214 V15.5.0, 3rd Generation Partnership Project; Technical Specification Group Radio Access Network; NR; Physical layer procedures for data (Release 15), Mar. 2019.
3GPP TS 38.215 V15.5.0, 3rd Generation Partnership Project; Technical Specification Group Radio Access Network; NR; Physical layer measurements (Release 15), Jun. 2019.
3GPP TS 38.300 V15.5.0, 3rd Generation Partnership Project; Technical Specification Group Radio Access Network; NR; NR and NG-RAN Overall Description; Stage 2 (Release 15), Mar. 2019.
3GPP TS 38.321 V15.5.0, 3rd Generation Partnership Project; Technical Specification Group Radio Access Network; NR; Medium Access Control (MAC) protocol specification (Release 15), Mar. 2019.
3GPP TS 38.322 V15.5.0, 3rd Generation Partnership Project; Technical Specification Group Radio Access Network; NR; Radio Link Control (RLC) protocol specification (Release 15), Mar. 2019.
3GPP TS 38.323 V15.5.0, 3rd Generation Partnership Project; Technical Specification Group Radio Access Network; NR; Packet Data Convergence Protocol (PDCP) specification (Release 15), Mar. 2019.
3GPP TS 38.331 V15.5.1, 3rd Generation Partnership Project; Technical Specification Group Radio Access Network; NR; Radio Resource Control (RRC) protocol specification (Release 15), Apr. 2019.

(56) References Cited

OTHER PUBLICATIONS

3GPP TS 38.401 V15.5.0, 3rd Generation Partnership Project; Technical Specification Group Radio Access Network; NG-RAN; Architecture description (Release 15), Mar. 2019.
3GPP TS 38.410 V15.2.0, 3rd Generation Partnership Project; Technical Specification Group Radio Access Network; NG-RAN; NG general aspects and principles (Release 15), Dec. 2018.
3GPP TS 38.413 V15.3.0, 3rd Generation Partnership Project; Technical Specification Group Radio Access Network; NG-RAN; NG Application Protocol (NGAP) (Release 15), Mar. 2019.
3GPP TS 38.420 V15.2.0, 3rd Generation Partnership Project; Technical Specification Group Radio Access Network; NG-RAN; Xn general aspects and principles (Release 15), Dec. 2018.
3GPP TS 38.423 V15.3.0, 3rd Generation Partnership Project; Technical Specification Group Radio Access Network; NG-RAN; Xn application protocol (XnAP) (Release 15), Mar. 2019.
3GPP TS 38.470 V15.5.0, 3rd Generation Partnership Project; Technical Specification Group Radio Access Network; NG-RAN; F1 general aspects and principles (Release 15), Mar. 2019.
3GPP TS 38.473 V15.5.0, 3rd Generation Partnership Project; Technical Specification Group Radio Access Network; NG-RAN; F1 application protocol (F1AP) (Release 15), Mar. 2019.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.889 V16.0.0, 3rd Generation Partnership Project; Technical Specification Group Radio Access Network; Study on NR-based access to unlicensed spectrum (Release 16), Dec. 2018.
3GPP TR 38.900 V15.0.0, "3rd Generation Partnership Project; Technical Specification Group Radio Access Network; Study on channel model for frequency spectrum above 6 GHz (Release 15)", Jun. 2018.
3GPP TR 38.912 V15.0.0, "3rd Generation Partnership Project; Technical Specification Group Radio Access Network; Study on New Radio (NR) access technology (Release 15)", Jun. 2018.
3GPP TR 38.913 V15.0.0, "3rd Generation Partnership Project; Technical Specification Group Radio Access Network; Study on Scenarios and Requirements for Next Generation Access Technologies; (Release 15)", June, 2018.
LG Electronics, Inc., "Ue based mobility in LTE-NR interworking", Agenda Item 3.2.2.4, 3GPP TSG-RAN WG2 NR, Ad-Hoc, R2-1700554, Spokane, USA, Jan. 17-19, 2017.
Qualcomm Incorporated, "Conditional HO design considerations WID/SID: NR mobility enhancements", Agenda Ietm 11.9.3, 3GPP TSG-RAN WG2, Meeting #105, R2-1900365 Athens, Greece, Feb. 25-Mar. 1, 2019.

* cited by examiner

BASE STATION, TERMINAL, AND WIRELESS COMMUNICATION SYSTEM

CROSS-REFERENCE TO RELATED APPLICATION

This application is a continuation application of International Application PCT/JP2019/046676 filed on Nov. 28, 2019 and designated the U.S., the entire contents of which are incorporated herein by reference.

FIELD

The embodiment discussed herein is related to a base station, a terminal, and a wireless communication system.

BACKGROUND

In current networks, communication traffic of terminals (e.g., smartphones, feature phones, and the like) occupies most of network resources. Furthermore, the traffic used by the terminals tends to keep expanding in the future.

On the other hand, with development of Internet of things (IoT) services (for example, transportation systems, smart meters, and monitoring systems of devices or the like), there is a need to cope with services having various request conditions. Thus, in communication standards of fifth generation mobile communication (5G or new radio (NR)), in addition to a standard technology of fourth generation mobile communication (4G), there is a need for a technology that achieves a higher data rate, a larger capacity, and lower latency. Note that, regarding the fifth generation communication standards, the Third Generation Partnership Project (3GPP) working groups (for example, TSG-RAN WG1 and TSG-RAN WG2) are proceeding with technical studies, and the first edition of written standards was issued at the end of 2017.

In a 5G wireless communication system, introduction of conditional handover (CHO) is being considered. In the CHO, a terminal does not start handover immediately after receiving an instruction to start the handover from a base station as a handover source, but starts the handover when specified conditions are satisfied. The specified conditions are, for example, that a difference between power received from the base station as the handover source and power received from a base station as a handover destination is equal to or greater than a predetermined value, and the power received from the base station as the handover destination is equal to or greater than a predetermined value. According to the CHO, since the handover is started after it is confirmed that a wireless environment is suitable for the terminal to perform the handover, for example, even when the wireless environment changes due to movement of the terminal, a success probability of the handover may be improved.

Furthermore, in the CHO, the base station as the handover source may notify, to the terminal, base stations as a plurality of handover destination candidates, and the terminal may determine a base station as a handover destination from the plurality of handover destination candidates. Since there is the plurality of handover destination candidates, the above-described conditions for starting the handover are likely to be satisfied, and time from the instruction of starting the handover to the satisfaction of the conditions may be shortened. Moreover, even when the handover to one handover destination candidate fails, it becomes possible to try handover to another handover destination candidate without performing new processing, and time needed for the handover may be shortened, and the handover with high reliability may be executed.

Japanese Laid-open Patent Publication No. 2007-194749, 3GPP TS 36.133 V16.0.0 (2018-12), 3GPP TS 36.211 V15.5.0 (2019-03), 3GPP TS 36.212 V15.5.0 (2019-03), 3GPP TS 36.213 V15.5.0 (2019-03), 3GPP TS 36.214 V15.3.0 (2018-09), 3GPP TS 36.300 V15.5.0 (2019-03), 3GPP TS 36.321 V15.5.0 (2019-03), 3GPP TS 36.322 V15.1.0 (2018-07), 3GPP TS 36.323 V15.3.0 (2019-03), 3GPP TS 36.331 V15.5.1 (2019-04), 3GPP TS 36.413 V15.5.0 (2019-03), 3GPP TS 36.423 V15.5.0 (2019-03), 3GPP TS 36.425 V15.0.0 (2018-06), 3GPP TS 37.324 V15.1.0 (2018-09), 3GPP TS 37.340 V15.5.0 (2019-03), 3GPP TS 38.201 V15.0.0 (2017-12), 3GPP TS 38.202 V15.4.0 (2018-12), 3GPP TS 38.211 V15.5.0 (2019-03), 3GPP TS 38.212 V15.5.0 (2019-03), 3GPP TS 38.213 V15.5.0 (2019-03), 3GPP TS 38.214 V15.5.0 (2019-03), 3GPP TS 38.215 V15.5.0 (2019-03), 3GPP TS 38.300 V15.5.0 (2019-03), 3GPP TS 38.321 V15.5.0 (2019-03), 3GPP TS 38.322 V15.5.0 (2019-03), 3GPP TS 38.323 V15.5.0 (2019-03), 3GPP TS 38.331 V15.5.1 (2019-04), 3GPP TS 38.401 V15.5.0 (2019-03), 3GPP TS 38.410 V15.2.0 (2018-12), 3GPP TS 38.413 V15.3.0 (2019-03), 3GPP TS 38.420 V15.2.0 (2018-12), 3GPP TS 38.423 V15.3.0 (2019-03), 3GPP TS 38.470 V15.5.0 (2019-03), 3GPP TS 38.473 V15.5.0 (2019-03), 3GPP TR 23.501 V16.1.0 (2019-06), 3GPP TR 38.801 V14.0.0 (2017-03), 3GPP TR 38.802 V14.2.0 (2017-09), 3GPP TR 38.803 V14.2.0 (2017-09), 3GPP TR 38.804 V14.0.0 (2017-03), 3GPP TR 38.900 V15.0.0 (2018-06), 3GPP TR 38.912 V15.0.0 (2018-06), 3GPP TR 38.913 V15.0.0 (2018-06), and 3GPP TR 38.889 V16.0.0 (2018-12) are disclosed as related art.

SUMMARY

According to an aspect of the embodiments, a base station includes: a receiver configured to receive, from a terminal, a handover destination notification including first identification information and second identification information, the first identification information being information for identifying a first base station as a handover destination determined by the terminal, the second identification information being information for identifying a preamble to be transmitted by the terminal to the first base station; and a transmitter configured to transmit an advance notification including third identification information and the second identification information to the first base station, the third identification information being information for identifying the terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
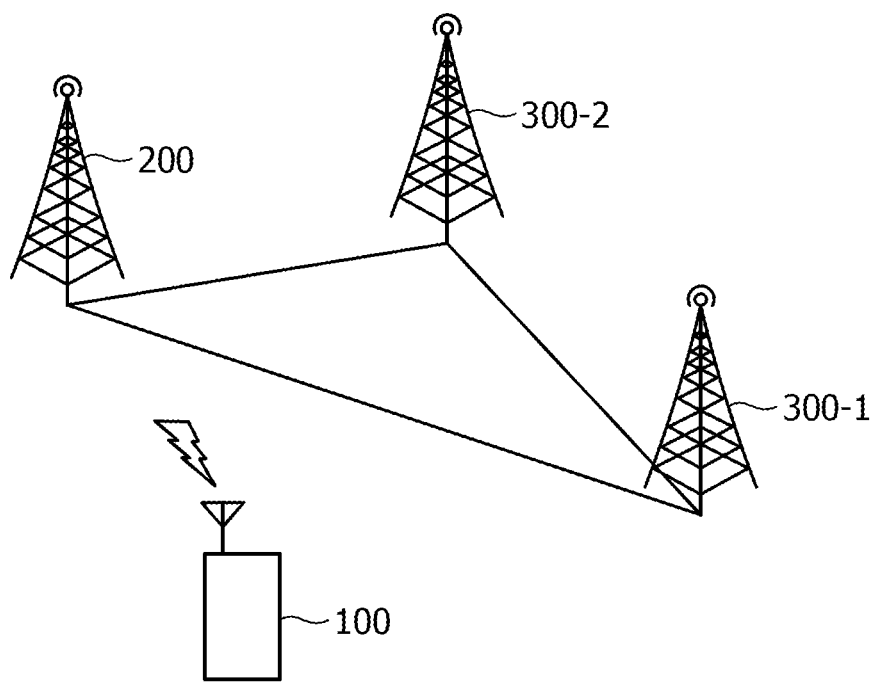
FIG. 1 is a diagram illustrating a structure of a wireless communication system according to an embodiment.

When the terminal performs handover to the base station as the handover destination, random access process is first performed. For example, the terminal transmits a preamble to the base station as the handover destination. Normally, in the random access process at the time of handover, contention-free random access is performed in which a preamble exclusively assigned to the terminal is transmitted to the base station as the handover destination. For example, a preamble used for the random access process is assigned in advance to the terminal that performs the handover by the base station as the handover destination, and this preamble is notified to the terminal via the base station as the handover source. Thus, when receiving the preamble transmitted from the terminal, the base station as the handover destination may immediately specify the terminal as a transmission source of the preamble, and the subsequent handover processing may be completed in a short time.

Note that the number of preambles that may be exclusively assigned by the base station to the terminal is limited. Thus, when there is a shortage of preambles available for the contention-free random access, contention-based random access may be performed. In the contention-based random access, the terminal selects an optional preamble from a plurality of preambles available for the base station, and transmits the selected preamble to the base station. The preamble used for the contention-free random access may be referred to as an "individual preamble", and the preamble used for the contention-based random access may be referred to as a "shared preamble".

However, in the random access process at the time of the CHO, there is a problem that use efficiency of the preamble is poor, and the time needed for the handover may not be sufficiently shortened. For example, when the contention-free random access is performed in the CHO, the base stations as the plurality of handover destination candidates each assign an individual preamble to one terminal. Since the terminal selects one handover destination candidate and uses the individual preamble assigned by the base station as the handover destination candidate, an individual preamble assigned to the terminal by another handover destination candidate is not used. For example, a base station that is not selected as the base station as the handover destination assigns an individual preamble that is not to be used as a result to the terminal, so that the use efficiency of the preamble deteriorates.

Then, as a result of the deterioration in the use efficiency of the preamble, it becomes difficult to assign the individual preamble to the terminal that performs the CHO due to a shortage of the individual preambles, and the contention-based random access may be performed. When the contention-based random access is performed in the CHO, the terminal selects and transmits an optional preamble from a plurality of shared preambles used by the base station as the handover destination. However, since the preamble transmitted by the terminal is not assigned by the base station as the handover destination, it is difficult for the base station as the handover destination to immediately specify a terminal as a transmission source of the preamble when receiving the preamble. Therefore, when the contention-based random access is performed, it takes time for the base station as the handover destination to specify the terminal as the transmission source of the preamble, and the time until the handover is completed becomes long. As a result, an inherent advantage of the CHO is lost.

The disclosed technology has been made in view of such points, and an object thereof is to provide a base station, a terminal, and a wireless communication system capable of improving use efficiency of a preamble and shortening handover time.

Hereinafter, an embodiment of a base station, a terminal, and a wireless communication system disclosed in the present application will be described in detail with reference to the drawings. Note that the embodiment does not limit the disclosed technology.

FIG. 1 is a diagram illustrating a structure of the wireless communication system according to the embodiment. The wireless communication system includes a terminal 100 and base stations 200, 300-1, and 300-2. The base stations 200, 300-1, and 300-2 are connected to each other in a wired manner and may communicate with each other. Note that the base stations 200, 300-1, and 300-2 may be directly connected in a wired manner as illustrated in FIG. 1, or may be connected in a wired manner via a host device (not illustrated).

The terminal 100 during measures, during wireless communication with the base station 200, wireless quality between the terminal 100 and the base station 200 by using a reference signal transmitted from the base station 200. Furthermore, by using reference signals transmitted from the base stations 300-1 and 300-2 positioned around the base station 200, the terminal 100 measures wireless quality between the terminal 100 and each of the base stations 300-1 and 300-2. Then, the terminal 100 periodically reports the measured wireless quality to the base station 200, and determines, when receiving a handover instruction from the base station 200 as a result of the report, a handover destination and executes handover.

When receiving the handover instruction from the base station 200, the terminal 100 determines whether or not conditions for performing the handover are satisfied, and determines, when the conditions are satisfied, a handover destination from handover destination candidates. For example, since the base stations 300-1 and 300-2 are specified as the handover destination candidates in the handover instruction from the base station 200, the terminal 100 determines the handover destination from the base stations 300-1 and 300-2 as the handover destination candidates.

Then, the terminal 100 selects an optional preamble from a plurality of shared preambles available for the base station as the handover destination, and transmits, to the base station 200 as the handover source, a handover destination notification (hereinafter referred to as "HO destination notification") in which identification information of the selected preamble and identification information of the base station as the handover destination are notified. Since the terminal 100 selects an optional preamble from the plurality of shared preambles, the base stations 300-1 and 300-2 as the handover destination candidates do not need to secure an individual preamble for the terminal 100, and deterioration in use efficiency of the preamble may be suppressed. After transmitting the HO destination notification, the terminal 100 transmits the selected preamble to the base station as the handover destination. Thereafter, the terminal 100 continues random access process with the base station as the handover destination, and completes the handover.

The base station 200 becomes, during wireless communication with the terminal 100, a base station as a handover source when the terminal 100 performs handover. The base station 200 receives a report on wireless quality from the terminal 100, and determines whether or not handover of the terminal 100 is needed. When the handover is needed, the base station 200 transmits, to the terminal 100, a handover instruction in which the base stations 300-1 and 300-2 to be handover destination candidates are specified.

Then, when receiving an HO destination notification from the terminal 100, the base station 200 transmits, to the base station selected as a handover destination, a random access advance notification (hereinafter referred to as "RA advance notification") including identification information of the terminal 100 and information regarding a preamble selected by the terminal 100. For example, the base station 200 notifies, in advance, the base station as the handover destination to which the terminal 100 transmits the preamble of the identification information of the terminal 100 and the preamble to be transmitted by the terminal 100. Thus, when the base station as the handover destination receives the preamble from the terminal 100, the base station as the handover destination may immediately specify the terminal 100, and time until the handover of the terminal 100 is completed may be shortened.

The base stations 300-1 and 300-2 are base stations positioned around the base station 200, and serve as base stations as handover destination candidates of the terminal 100. For example, reference signals transmitted from the base stations 300-1 and 300-2 may be received by the terminal 100, and wireless quality between the terminal 100 and each of the base stations 300-1 and 300-2 is measured by the terminal 100.

When the terminal 100 performs handover, the base stations 300-1 and 300-2 determine propriety of the handover of the terminal 100 to the base stations 300-1 and 300-2 in response to a handover request from the base station 200, and notify the base station 200 of a determination result. Then, when the base station 300-1 or 300-2 is determined as the handover destination, the base station 300-1 or 300-2 receives an RA advance notification from the base station 200, and subsequently receives a preamble from the terminal 100. Since the RA advance notification includes identification information of the terminal 100 and information regarding the preamble transmitted by the terminal 100, the base station 300-1 or 300-2 as the handover destination immediately specifies the terminal 100 when receiving the preamble. Then, the base station 300-1 or 300-2 as the handover destination completes the handover of the terminal 100.

Figure 2:
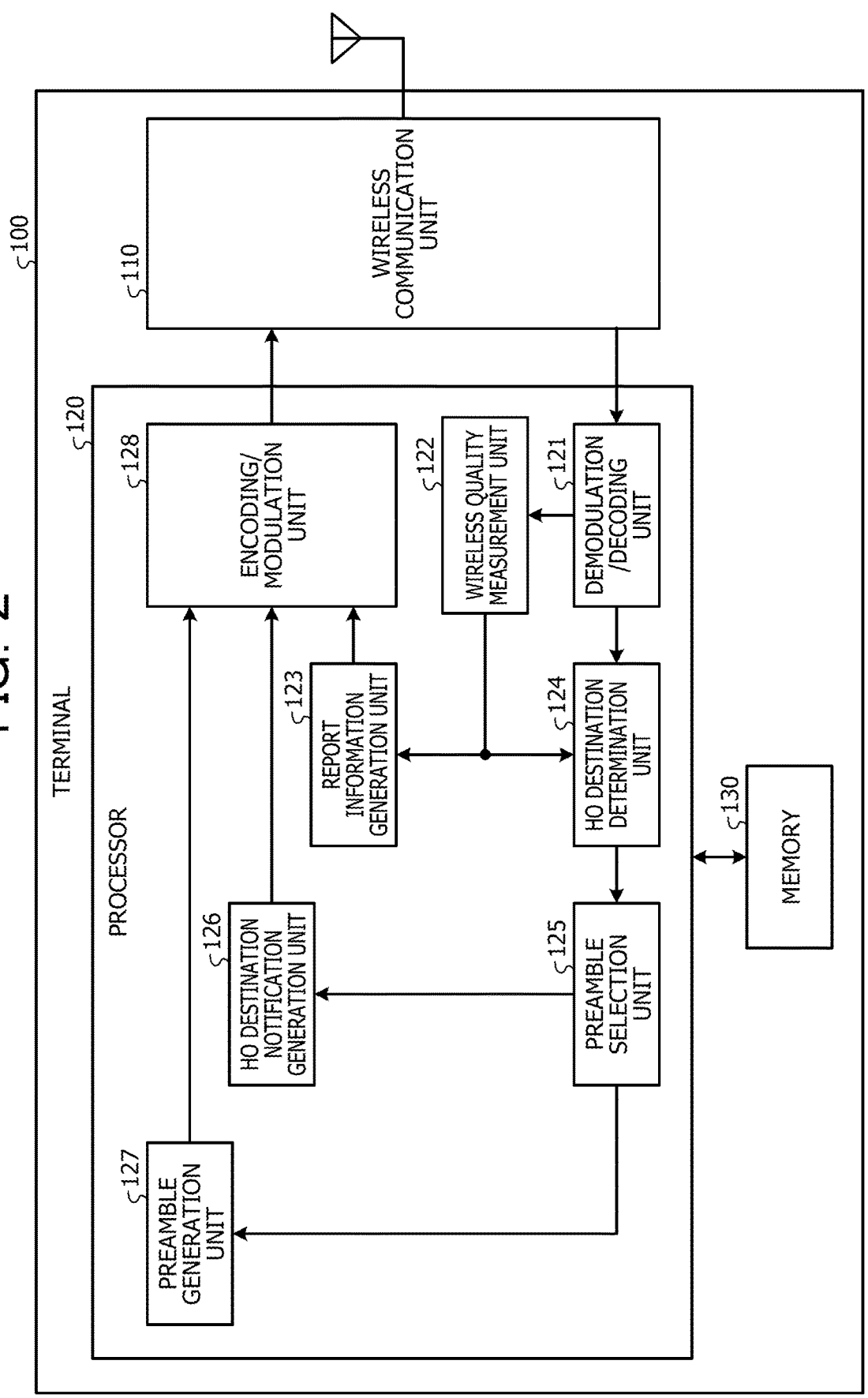
FIG. 2 is a block diagram illustrating a structure of a terminal according to the embodiment.

FIG. 2 is a block diagram illustrating a structure of the terminal 100 according to the embodiment. The terminal 100 illustrated in FIG. 2 includes a wireless communication unit 110, a processor 120, and a memory 130.

The wireless communication unit 110 transmits and receives a signal to and from the base station 200 as the wireless communication partner. For example, the wireless communication unit 110 performs predetermined wireless transmission processing on a transmission signal, and wirelessly transmits the transmission signal to the base station 200 via an antenna. Furthermore, the wireless communication unit 110 wirelessly receives a signal from the base station 200 via the antenna, and performs predetermined wireless reception processing on the reception signal.

Moreover, the wireless communication unit 110 wirelessly receives reference signals transmitted from the base stations 300-1 and 300-2 around the base station 200. Then, when the terminal 100 performs handover to any one of the base stations 300-1 and 300-2, the wireless communication unit 110 transmits and receives a signal to and from the base station 300-1 or 300-2 as the handover destination.

The processor 120 includes, for example, a central processing unit (CPU), a field programmable gate array (FPGA), or a digital signal processor (DSP), and integrally controls the entire terminal 100. For example, the processor 120 includes a demodulation/decoding unit 121, a wireless quality measurement unit 122, a report information generation unit 123, a handover destination determination unit (hereinafter abbreviated as "HO destination determination unit") 124, a preamble selection unit 125, an HO destination notification generation unit 126, a preamble generation unit 127, and an encoding/modulation unit 128.

The demodulation/decoding unit 121 demodulates and decodes a reception signal received by the wireless communication unit 110. For example, the demodulation/decoding unit 121 demodulates and decodes a reference signal received from each of the base stations 200, 300-1, and 300-2. Furthermore, the demodulation/decoding unit 121 demodulates and decodes a handover instruction (hereinafter referred to as "HO instruction") received from the base station 200.

The wireless quality measurement unit 122 measures, by using a reference signal received from each of the base stations 200, 300-1, and 300-2, wireless quality between the terminal 100 and each of the base stations 200, 300-1, and 300-2. Then, the wireless quality measurement unit 122 notifies the report information generation unit 123 of the wireless quality relating to each of the base stations 200, 300-1, and 300-2. Furthermore, when an HO instruction is received from the base station 200, the wireless quality measurement unit 122 notifies the HO destination determination unit 124 of the wireless quality relating to the base station 200 as the handover source and the wireless quality relating to the base stations 300-1 and 300-2 as the handover destination candidates.

The report information generation unit 123 generates report information for reporting wireless quality relating to the base stations 200, 300-1, and 300-2, which is measured by the wireless quality measurement unit 122. For example, the report information generation unit 123 generates report information for reporting, to the base station 200, wireless quality between the terminal 100 and each of the base stations 200, 300-1, and 300-2. The report information generation unit 123 generates the report information, for example, periodically at a predetermined cycle or as needed.

The HO destination determination unit 124 determines, when an HO instruction is received from the base station 200, whether or not conditions for executing handover are satisfied on the basis of wireless quality relating to the base station 200 as the handover source and wireless quality relating to the base stations 300-1 and 300-2 as the handover destination candidates. For example, the HO destination determination unit 124 determines whether or not a difference between the wireless quality relating to the base station 200 as the handover source and the wireless quality relating to the base stations 300-1 and 300-2 as the handover destination candidates is equal to or greater than a predetermined value, and the wireless quality relating to the base stations 300-1 and 300-2 as the handover destination candidates is equal to or greater than a predetermined value. Then, the HO destination determination unit 124 determines the base station as the handover destination candidate that satisfies the conditions as the base station as the handover destination. For example, the HO destination determination unit 124 determines the base station 300-1 as the handover destination when a difference between the wireless quality relating to the base station 200 and the wireless quality relating to the base station 300-1 is equal to or greater than a predetermined value, and the wireless quality relating to the base station 300-1 is equal to or greater than a predetermined value.

The preamble selection unit 125 selects, when the HO destination determination unit 124 determines a base station as a handover destination, one preamble from shared preambles available for this base station. For example, the preamble selection unit 125 optionally selects one preamble from a plurality of shared preambles available for the base station 300-1 determined as the handover destination. The shared preambles are preambles used for contention-based random access, and are not secured for a specific terminal. Thus, the preamble selection unit 125 may select the same preamble as the preamble selected by another terminal. On the other hand, since the preamble selection unit 125 optionally selects a preamble from the shared preambles, the base station 300-1 as the handover destination does not need to secure an individual preamble for the terminal 100.

The HO destination notification generation unit 126 generates an HO destination notification for notifying the base station 200 of the base station as the handover destination determined by the HO destination determination unit 124 and a preamble selected by the preamble selection unit 125. For example, the HO destination notification generation unit 126 generates an HO destination notification including identification information of the base station 300-1 determined as the handover destination and identification information of the selected preamble. The HO destination notification notifies the base station 200 as the handover source of the handover destination of the terminal 100.

The preamble generation unit 127 generates a preamble selected by the preamble selection unit 125. For example, the preamble generation unit 127 generates one preamble selected from a plurality of shared preambles available for the base station 300-1 as the handover destination.

The encoding/modulation unit 128 encodes and modulates transmission data to generate a transmission signal. For example, the encoding/modulation unit 128 encodes and modulates report information generated by the report information generation unit 123, and generates a transmission signal to be transmitted to the base station 200. Furthermore, the encoding/modulation unit 128 encodes and modulates an HO destination notification generated by the HO destination notification generation unit 126, and generates a transmission signal to be transmitted to the base station 200. Moreover, the encoding/modulation unit 128 encodes and modulates a preamble generated by the preamble generation unit 127, and generates a transmission signal to be transmitted to the base station 300-1 as the handover destination. Each transmission signal generated by the encoding/modulation unit 128 is subjected to predetermined wireless transmission processing by the wireless communication unit 110, and then transmitted to the base station 200 or the base station 300-1 as the handover destination.

The memory 130 includes, for example, a random access memory (RAM) or a read only memory (ROM), and stores information to be used for processing by the processor 120.

Figure 3:
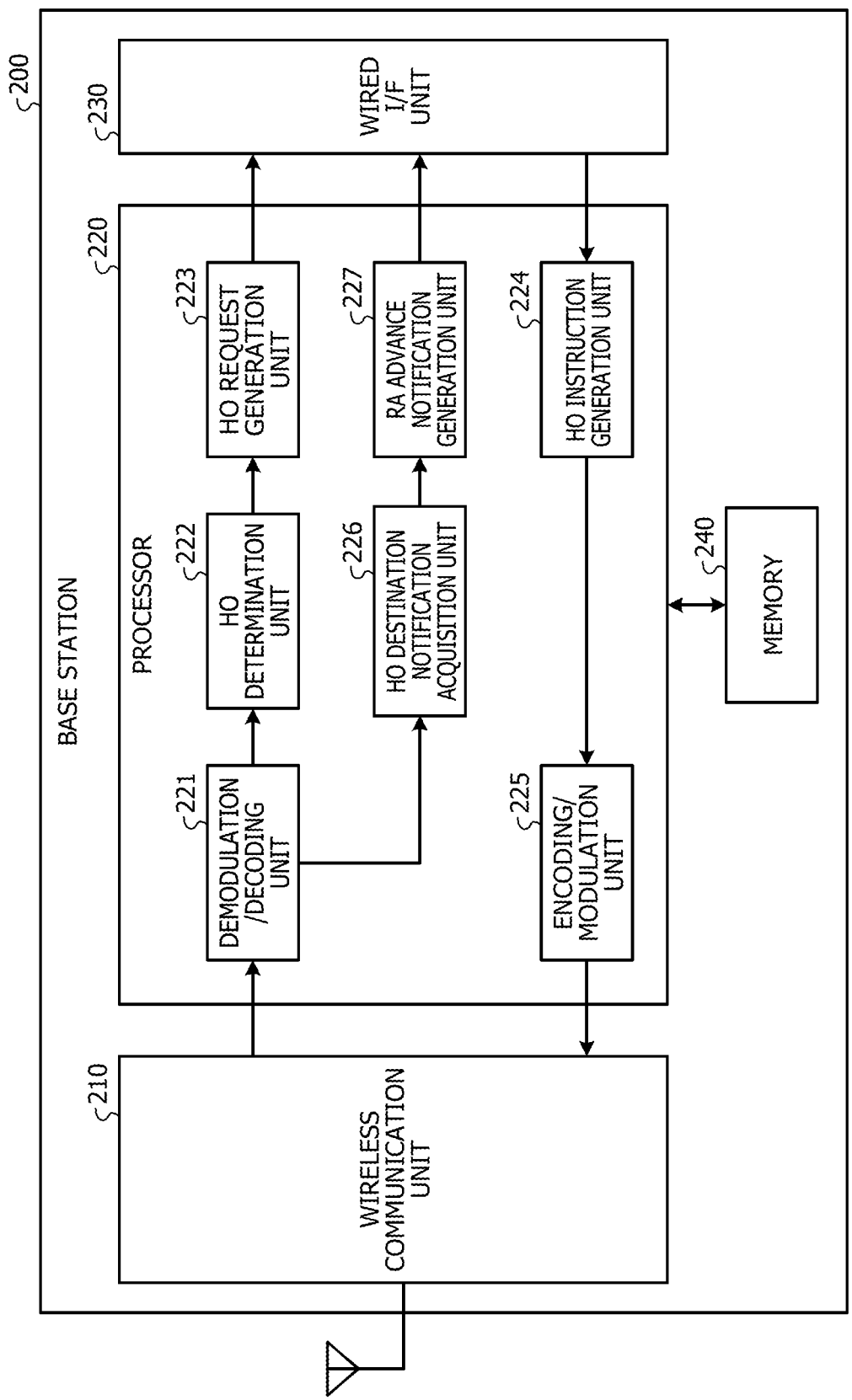
FIG. 3 is a block diagram illustrating a structure of a base station as a handover source according to the embodiment.

FIG. 3 is a block diagram illustrating a structure of the base station 200 as the handover source according to the embodiment. The base station 200 illustrated in FIG. 3 includes a wireless communication unit 210, a processor 220, a wired interface unit (hereinafter abbreviated as "wired I/F unit") 230, and a memory 240.

The wireless communication unit 210 transmits and receives a signal to and from the terminal 100 as the wireless communication partner. For example, the wireless communication unit 210 performs predetermined wireless transmission processing on a transmission signal, and wirelessly transmits the transmission signal to the terminal 100 via an antenna. Furthermore, the wireless communication unit 210 wirelessly receives a signal from the terminal 100 via the antenna, and performs predetermined wireless reception processing on the reception signal.

The processor 220 includes, for example, a CPU, a FPGA, or a DSP, and integrally controls the entire base station 200. For example, the processor 220 includes a demodulation/decoding unit 221, a handover determination unit (hereinafter abbreviated as "HO determination unit") 222, a handover request generation unit (hereinafter abbreviated as "HO request generation unit") 223, an HO instruction generation unit 224, an encoding/modulation unit 225, an HO destination notification acquisition unit 226, and an RA advance notification generation unit 227.

The demodulation/decoding unit 221 demodulates and decodes a reception signal received by the wireless communication unit 210. For example, the demodulation/decoding unit 221 demodulates and decodes report information and an HO destination notification received from the terminal 100.

The HO determination unit 222 determines whether or not to cause the terminal 100 to perform handover on the basis of report information from the terminal 100. For example, the HO determination unit 222 determines that the terminal 100 is caused to perform handover in a case where wireless quality between the terminal 100 and the base station 200 is lower than a predetermined standard, and there is a base station having wireless quality with respect to the terminal 100 higher than the predetermined standard in the peripheral base stations 300-1 and 300-2. Then, the HO determination unit 222 selects, as the handover destination candidate, the base station having the wireless quality with respect to the terminal 100 higher than the predetermined standard, and notifies the HO request generation unit 223 of the selected handover destination candidate. Here, the description will be continued assuming that the base stations as the handover destination candidates are the base stations 300-1 and 300-2.

The HO request generation unit 223 generates a handover request (hereinafter referred to as "HO request") inquiring whether or not handover of the terminal 100 may be accepted to the base stations 300-1 and 300-2 as the handover destination candidates. At this time, the HO request generation unit 223 generates, for example, the HO request including identification information of the terminal 100. Then, the HO request generation unit 223 transmits the HO request to the base stations 300-1 and 300-2 as the handover destination candidates via the wired I/F unit 230.

The HO instruction generation unit 224 acquires a response to an HO request via the wired I/F unit 230. For example, the HO instruction generation unit 224 acquires a notification of propriety of acceptance of handover of the terminal 100 from each of the base stations 300-1 and 300-2 as the handover destination candidates. Then, the HO instruction generation unit 224 generates an HO instruction instructing to execute the handover by using the base station that permits the handover as the handover destination candidate. Here, the description will be continued assuming that the base stations 300-1 and 300-2 both permit the handover of the terminal 100 and are the handover destination candidates.

The encoding/modulation unit 225 encodes and modulates transmission data to generate a transmission signal. For example, the encoding/modulation unit 225 encodes and modulates an HO instruction generated by the HO instruction generation unit 224, and generates a transmission signal to be transmitted to the terminal 100.

The HO destination notification acquisition unit 226 acquires an HO destination notification received from the terminal 100, and specifies a base station as a handover destination selected by the terminal 100 and a preamble to be transmitted to this base station. For example, since the HO destination notification includes identification information of the base station 300-1 determined as the handover destination and identification information of the selected preamble, the HO destination notification acquisition unit 226 specifies the base station 300-1 and the preamble from these pieces of identification information.

The RA advance notification generation unit 227 generates an RA advance notification for notifying in advance that the terminal 100 will perform random access process to the base station 300-1 as the handover destination specified by the HO destination notification acquisition unit 226. For example, the RA advance notification generation unit 227 generates an RA advance notification for notifying in advance that a preamble is transmitted from the terminal 100 to the base station 300-1. For example, the RA advance notification generation unit 227 generates an RA advance notification including identification information of the terminal 100 and identification information of a preamble to be transmitted from the terminal 100 to the base station 300-1. Then, the RA advance notification generation unit 227 transmits the RA advance notification to the base station 300-1 as the handover destination via the wired I/F unit 230.

The wired I/F unit 230 is an interface capable of connecting in a wired manner to and communicating with other base stations including the base stations 300-1 and 300-2. The wired I/F unit 230 may be directly connected to other base stations in a wired manner, or may be connected to other base stations in a wired manner via a host device connected to a plurality of base stations.

The memory 240 includes, for example, a RAM or a ROM, and stores information used for processing by the processor 220.

Figure 4:
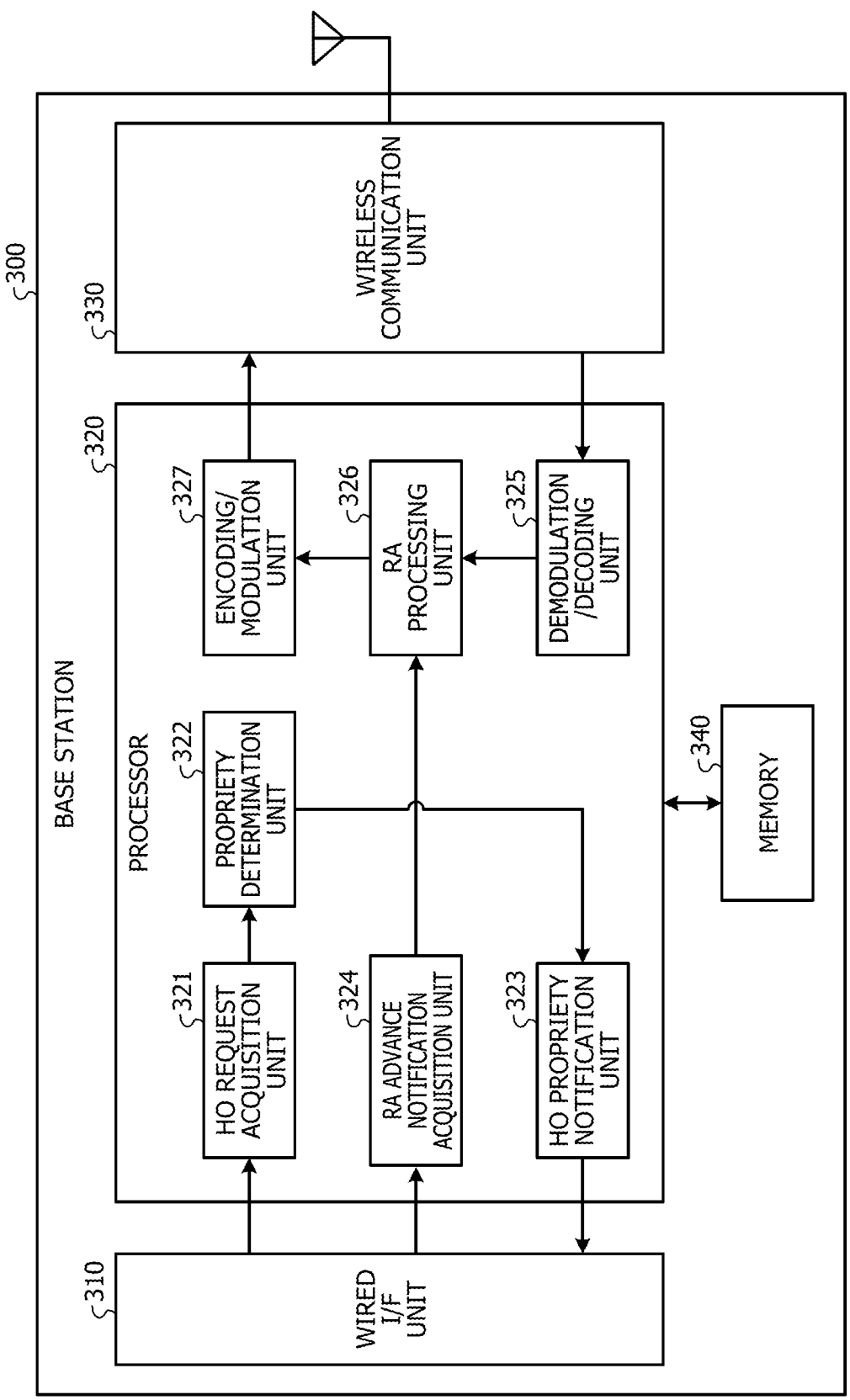
FIG. 4 is a block diagram illustrating a structure of a base station as a handover destination according to the embodiment.

FIG. 4 is a block diagram illustrating a structure of a base station 300 as a handover destination according to the embodiment. The base station 300 illustrated in FIG. 4 has a similar structure to those of the base stations 300-1 and 300-2, and includes a wired I/F unit 310, a processor 320, a wireless communication unit 330, and a memory 340.

The wired I/F unit 310 is an interface capable of connecting in a wired manner to and communicating with other base stations including the base station 200. The wired I/F unit 310 may be directly connected to other base stations in a wired manner, or may be connected to other base stations in a wired manner via a host device connected to a plurality of base stations.

The processor 320 includes, for example, a CPU, a FPGA, or a DSP, and integrally controls the entire base station 300. For example, the processor 320 includes an HO request acquisition unit 321, a propriety determination unit 322, an HO propriety notification unit 323, an RA advance notification acquisition unit 324, a demodulation/decoding unit 325, a random access processing unit (hereinafter abbreviated to as "RA processing unit") 326, and an encoding/modulation unit 327.

The HO request acquisition unit 321 acquires an HO request received from the base station 200 as the handover source via the wired I/F unit 310. For example, the HO request acquisition unit 321 acquires an HO request including identification information of the terminal 100.

The propriety determination unit 322 determines, when an HO request is acquired by the HO request acquisition unit 321, whether or not handover of the terminal 100 may be accepted. At this time, the propriety determination unit 322 determines whether or not the handover of the terminal 100 may be accepted based on, for example, the number of terminals already in wireless communication with the base station 300, and a processing load of the processor 320.

The HO propriety notification unit 323 notifies the base station 200 of a determination result by the propriety determination unit 322 via the wired I/F unit 310. For example, the HO propriety notification unit 323 notifies the base station 200 as the handover source of whether or not to accept handover of the terminal 100.

The RA advance notification acquisition unit 324 acquires, when the base station 300 becomes the handover destination of the terminal 100, an RA advance notification received from the base station 200 as the handover source via the wired I/F unit 310. For example, the RA advance notification acquisition unit 324 acquires an RA advance notification including identification information of the terminal 100 and identification information of a preamble to be transmitted from the terminal 100. Then, the RA advance notification acquisition unit 324 notifies the RA processing unit 326 of the identification information of the terminal 100 and the identification information of the preamble.

The demodulation/decoding unit 325 demodulates and decodes a reception signal received by the wireless communication unit 330. For example, the demodulation/decoding unit 325 demodulates and decodes a preamble received from the terminal 100.

The RA processing unit 326 executes random access process by using a preamble demodulated and decoded by the demodulation/decoding unit 325. At this time, when the preamble demodulated and decoded by the demodulation/decoding unit 325 is a preamble whose identification information has been notified from the RA advance notification acquisition unit 324, the RA processing unit 326 specifies that a transmission source of the preamble is the terminal 100. Then, the RA processing unit 326 generates a response signal to the preamble. This response signal is not a response signal for specifying the transmission source of the preamble, but a response signal for establishing a connection with the specified terminal 100. Therefore, the RA processing unit 326 generates a response signal that has been subjected to scramble processing unique to the terminal 100.

The encoding/modulation unit 327 encodes and modulates transmission data to generate a transmission signal. For example, the encoding/modulation unit 327 encodes and modulates a response signal generated by the RA processing unit 326, and generates a transmission signal to be transmitted to the terminal 100.

The wireless communication unit 330 transmits and receives a signal to and from the terminal 100 that has selected the base station 300 as the handover destination. For example, the wireless communication unit 330 performs predetermined wireless transmission processing on a transmission signal, and wirelessly transmits the transmission signal to the terminal 100 via an antenna. Furthermore, the wireless communication unit 330 wirelessly receives a signal from the terminal 100 via the antenna, and performs predetermined wireless reception processing on the reception signal.

The memory 340 includes, for example, a RAM or a ROM, and stores information used for processing by the processor 320.

Figure 5:
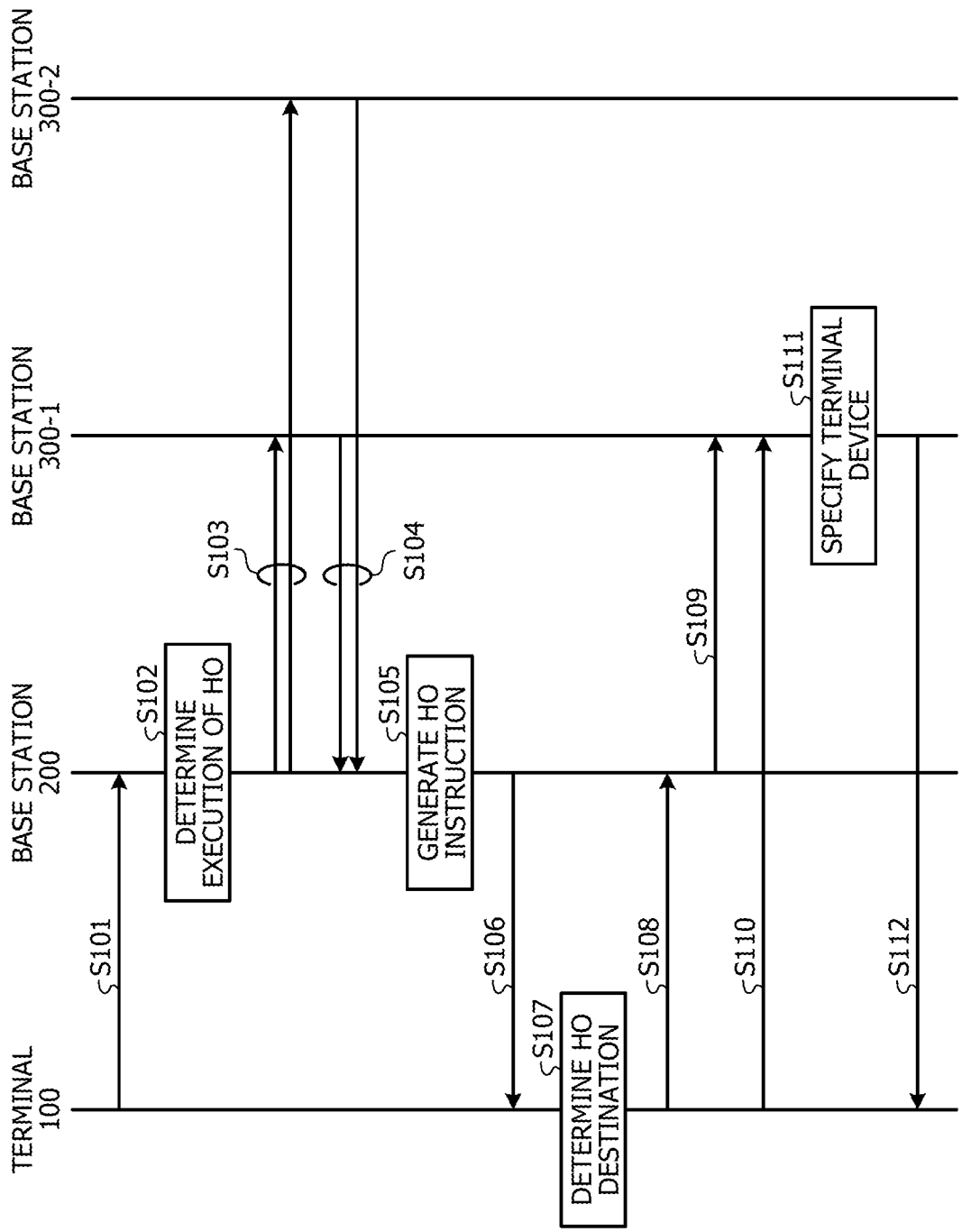
FIG. 5 is a sequence diagram illustrating a handover method according to the embodiment.

Next, a handover method in the wireless communication system configured as described above will be described with reference to a sequence diagram illustrated in FIG. 5. In the following, a case will be described where the terminal 100 performs handover from the base station 200 to the base station 300-1.

The base stations 200, 300-1, and 300-2 periodically transmit reference signals, and the reference signals are received by the wireless communication unit 110 of the terminal 100. Then, the reference signals are used by the wireless quality measurement unit 122 to measure wireless quality between the terminal 100 and each of the base stations 200, 300-1, and 300-2. Report information for reporting the measured wireless quality is generated by the report information generation unit 123, and transmitted from the wireless communication unit 110 to the base station 200 (Step S101).

The report information is received by the wireless communication unit 210 of the base station 200, and the HO determination unit 222 determines whether or not to cause the terminal 100 to perform handover. Here, it is assumed that the wireless quality between the terminal 100 and the base station 200 is lower than a predetermined standard, the wireless quality between the terminal 100 and the base stations 300-1 and 300-2 is higher than the predetermined standard, and it is determined that the terminal 100 is caused to execute the handover (Step S102). Since the wireless quality between the terminal 100 and the base stations 300-1 and 300-2 is higher than the predetermined standard, the base stations 300-1 and 300-2 become the handover destination candidates. Thus, an HO request including identification information of the terminal 100 is generated by the HO request generation unit 223, and transmitted to the base stations 300-1 and 300-2 via the wired I/F unit 230 (Step S103).

The HO request is received by the wired I/F unit 310 of each of the base stations 300-1 and 300-2, and is acquired by the HO request acquisition unit 321. Then, whether or not to accept the handover of the terminal 100 is determined by the propriety determination unit 322 of each of the base stations 300-1 and 300-2, and a determination result is notified from the HO propriety notification unit 323 to the base station 200 via the wired I/F unit 310 (Step S104). Here, the description will be continued assuming that it is determined that the handover of the terminal 100 is permitted in both the base stations 300-1 and 300-2. The notification that the handover is permitted may include, for example, identification information (for example, a cell-radio network temporary identifier (C-RNTI)) assigned to the terminal 100 in a cell formed by each of the base stations 300-1 and 300-2 after the handover, or information regarding wireless resources to be used for random access process at the time of the handover (for example, a position in a time domain and a frequency domain of a slot to be used for transmission of a preamble, or a value of a parameter of an expression indicating a code string for generating a preamble).

The permission notification of the handover is received by the wired I/F unit 230 of the base station 200, and the HO instruction generation unit 224 generates an HO instruction specifying a base station as a handover destination candidate (Step S105). For example, here, an HO instruction specifying the base stations 300-1 and 300-2 as the handover destination candidates is generated. The HO instruction is transmitted to the terminal 100 via the wireless communication unit 210 (Step S106). The HO instruction may include, for example, information regarding wireless resources to be used for random access process specified by each of the handover destination candidates.

Then, the HO instruction is received by the wireless communication unit 110 of the terminal 100, and the HO destination determination unit 124 determines whether or not conditions for executing the handover are satisfied. For example, it is determined whether or not a difference between the wireless quality relating to the base station 200 as the handover source and the wireless quality relating to the base stations 300-1 and 300-2 as the handover destination candidates is equal to or greater than a predetermined value, and the wireless quality relating to the base stations 300-1 and 300-2 as the handover destination candidates is equal to or greater than a predetermined value. Then, the HO destination determination unit 124 determines the base station as the handover destination candidate that satisfies the conditions as the handover destination (Step S107). Here, the description will be continued assuming that the base station 300-1 is determined as the handover destination.

When the handover destination is determined, the preamble selection unit 125 selects a preamble to be transmitted to the base station 300-1 as the handover destination. For example, one preamble is selected from shared preambles available for the base station 300-1. The shared preambles available for each of the base stations 300-1 and 300-2 are notified in advance. Then, an HO destination notification including identification information of the base station 300-1 determined as the handover destination and identification information of the selected preamble is generated by the HO destination notification generation unit 126, and transmitted to the base station 200 via the wireless communication unit 110 (Step S108). Note that the HO destination notification may include information specifying a slot to be used for transmission of the preamble from wireless resources to be used for random access process specified by the base station 300-1 as the handover destination. For example, the HO destination notification may include information regarding a timing at which the preamble is transmitted from the terminal 100 to the base station 300-1.

The HO destination notification is received by the wireless communication unit 210 of the base station 200, and is acquired by the HO destination notification acquisition unit 226. Then, the RA advance notification generation unit 227 generates an RA advance notification including the identification information of the terminal 100 and the identification information of the preamble to be transmitted from the terminal 100 to the base station 300-1. The RA advance notification is transmitted to the base station 300-1 via the wired I/F unit 230 (Step S109). Note that the RA advance notification may include the information specifying the slot to be used for transmission of the preamble, which is notified from the terminal 100.

The RA advance notification is received by the wired I/F unit 310 of the base station 300-1, and is acquired by the RA advance notification acquisition unit 324. Then, the identification information of the terminal 100 and the identification information of the preamble are notified to the RA processing unit 326. With this configuration, the RA processing unit 326 may store the identification information (for example, C-RNTI) of the terminal 100 that is to perform handover and the identification information of the preamble to be transmitted by the terminal 100 at the time of the handover in association with each other.

Incidentally, after the HO destination notification is transmitted from the terminal 100 to the base station 200, a preamble generated by the preamble generation unit 127 is transmitted from the terminal 100 to the base station 300-1 via the wireless communication unit 110 (Step S110). For example, random access process is started between the terminal 100 and the base station 300-1 as the handover destination. The preamble is transmitted in the slot notified to the base station 300-1 via the base station 200 by the HO destination notification and the RA advance notification. Therefore, the base station 300-1 knows in advance the slot in which the preamble is received, which is notified in advance by the RA advance notification.

The preamble is received by the wireless communication unit 330 of the base station 300-1. Then, when the received preamble is the preamble notified in advance by the RA advance notification, the RA processing unit 326 specifies the terminal 100 associated with identification information of the preamble (Step S111). For example, in the RA processing unit 326, since the terminal 100 and the preamble transmitted by the terminal 100 are associated with each other in advance by the RA advance notification, it is not needed to specify the terminal as the transmission source of the preamble again.

Then, the RA processing unit 326 generates a response signal to the preamble, and transmits the response signal to the terminal 100 via the wireless communication unit 330 (Step S112). For example, since the transmission source of the preamble is specified as the terminal 100, the RA processing unit 326 generates a response signal that has been subjected to scramble processing unique to the terminal 100 and transmits the response signal to the terminal 100. Here, since the preamble transmitted by the terminal 100 is one of the shared preambles, a terminal other than the terminal 100 may transmit the same preamble at the same timing. However, since the response signal to the preamble has been subjected to the scramble processing unique to the terminal 100, the response signal is not correctly decoded by a terminal other than the terminal 100. Therefore, the response signal is correctly decoded only by the terminal 100, a connection between the terminal 100 and the base station 300-1 is established, and the handover is completed.

In this way, when determining the handover destination, the terminal 100 selects the preamble, and transmits the HO destination notification to the base station 200 as the handover source. The base station 200 transmits the RA advance notification to the base station 300-1 as the handover destination, and notifies in advance the identification information of the terminal 100 and the identification information of the preamble to be transmitted. Thus, when the preamble is transmitted from the terminal 100 to the base station 300-1, the base station 300-1 does not need to specify the terminal as the transmission source of the preamble, and the time needed for the random access process at the time of the handover may be shortened. Furthermore, since the terminal 100 selects one preamble from the shared preambles, both the base stations 300-1 and 300-2 as the handover destination candidates do not need to assign the individual preamble to the terminal 100. Thus, it is not needed for the base stations 300-1 and 300-2 to secure the preamble for the terminal 100, and use efficiency of the preamble may be improved.

Figure 6:
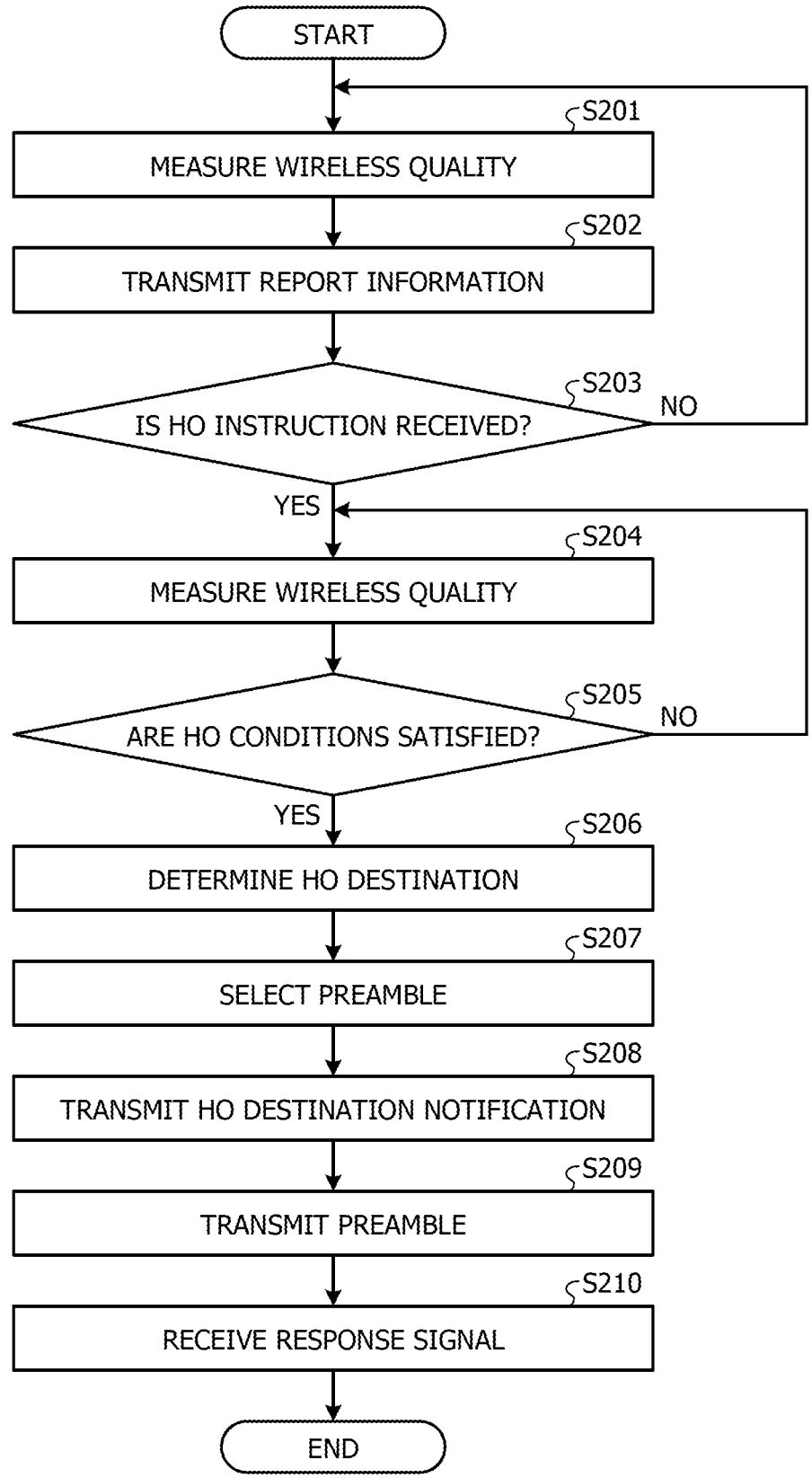
FIG. 6 is a flow diagram illustrating operation of the terminal.

Next, operation of the terminal 100 will be described with reference to a flow diagram illustrated in FIG. 6.

Reference signals periodically transmitted from the base stations 200, 300-1, and 300-2 are received by the wireless communication unit 110, and the reference signals are used by the wireless quality measurement unit 122 to measure wireless quality with respect to each of the base stations 200, 300-1, and 300-2 (Step S201). The wireless quality may be, for example, a signal to interference ratio (SIR) or a signal to interference and noise ratio (SINR), or may be reception power of the reference signal.

The measured wireless quality is notified to the report information generation unit 123, and report information including the measurement result of the wireless quality is generated. The report information is encoded and modulated by the encoding/modulation unit 128, and is transmitted from the wireless communication unit 110 to the base station 200 as the handover source (Step S202). When the report information is transmitted, an HO instruction from the base station 200 is awaited (Step S203), and while the HO instruction is not received (No in Step S203), the transmission of the report information is periodically repeated.

When the HO instruction is received from the base station 200 (Yes in Step S203), the wireless quality measurement unit 122 measures the wireless quality relating to the base station 200 as the handover source and the wireless quality relating to the base stations 300-1 and 300-2 as the handover destination candidates (Step S204). Then, based on the wireless quality, the HO destination determination unit 124 determines whether or not conditions for executing handover are satisfied (Step S205). As a result of this determination, when the conditions are not satisfied (No in Step S205), the measurement of the wireless quality is repeated and satisfaction of the conditions is awaited.

When the conditions for executing the handover are satisfied (Yes in Step S205), a base station as a handover destination is determined from the base stations 300-1 and 300-2 as the handover destination candidates (Step S206). For example, the HO destination determination unit 124 determines the base station 300-1 as the handover destination. Then, the preamble selection unit 125 optionally selects one preamble from shared preambles available for the base station 300-1 as the handover destination (Step S207).

The base station 300-1 as the handover destination and the selected preamble is notified to the HO destination notification generation unit 126, and an HO destination notification including identification information of the base station 300-1 and identification information of the selected preamble is generated. At this time, information regarding a slot used for transmitting the selected preamble to the base station 300-1 may be included in the HO destination notification. The HO destination notification is encoded and modulated by the encoding/modulation unit 128, and is transmitted from the wireless communication unit 110 to the base station 200 as the handover source (Step S208).

Furthermore, the preamble generation unit 127 generates the preamble selected by the preamble selection unit 125. The preamble is encoded and modulated by the encoding/modulation unit 128, and is transmitted from the wireless communication unit 110 to the base station 300-1 as the handover destination (Step S209). The preamble may be transmitted by using the slot notified in advance by the HO destination notification.

When the preamble is transmitted, a response signal to the preamble is received from the base station 300-1 (Step S210). For example, after the preamble is transmitted, processing of causing the base station 300-1 to specify a transmission source of the preamble may be omitted, and a connection with the base station 300-1 may be established.

This is because, when the HO destination notification is transmitted to the base station 200 as the handover source, the identification information of the terminal 100 and the preamble to be transmitted are notified in advance to the base station 300-1 via the base station 200.

In this way, since the processing of causing the base station 300-1 to specify the transmission source of the preamble may be omitted, the terminal 100 may shorten the time needed for the handover.

Figure 7:
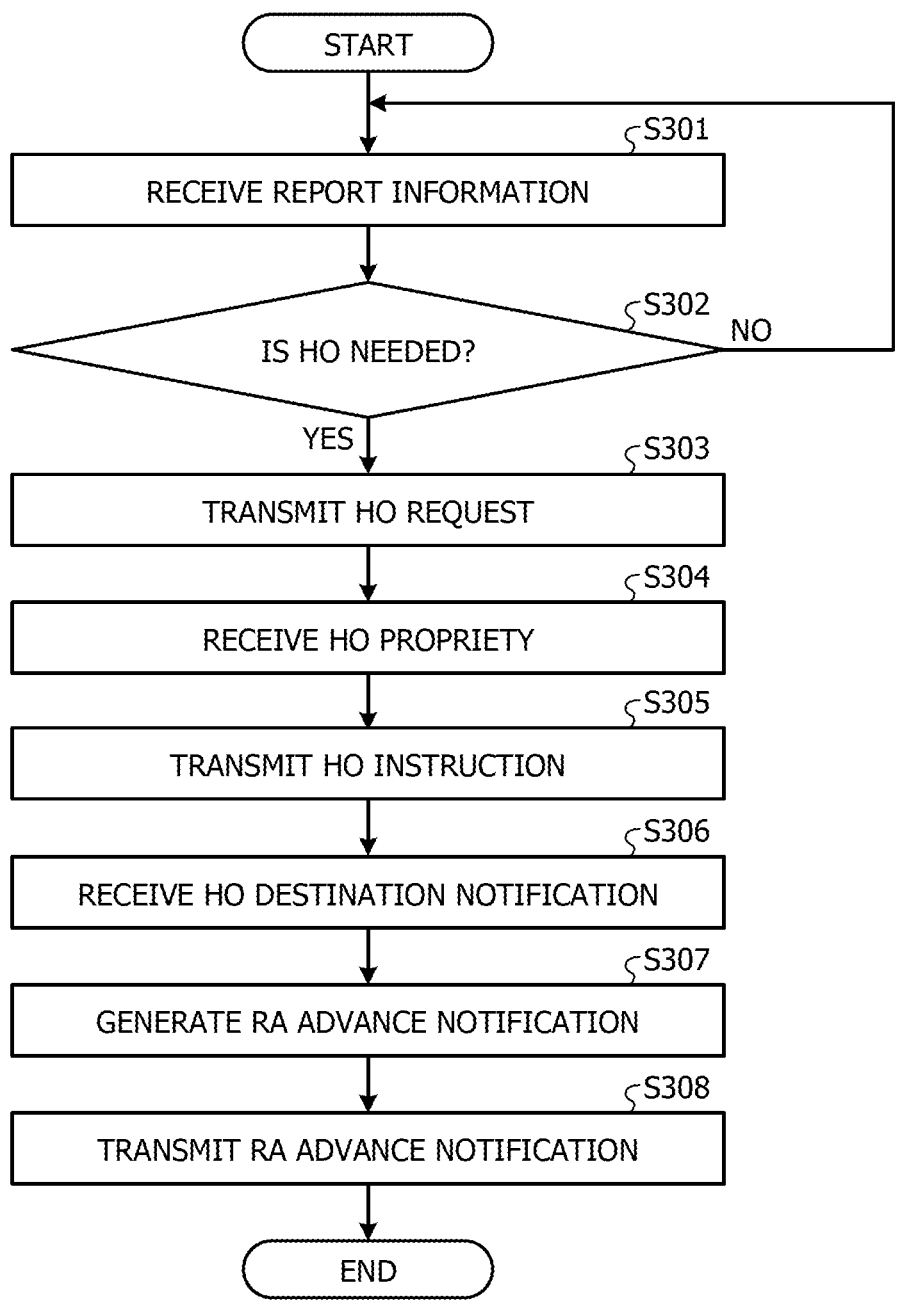
FIG. 7 is a flow diagram illustrating operation of the base station as the handover source.

Next, operation of the base station 200 as the handover source will be described with reference to a flow diagram illustrated in FIG. 7.

Report information transmitted from the terminal 100 is received by the wireless communication unit 210 (Step S301), and is demodulated and decoded by the demodulation/decoding unit 221. Then, the HO determination unit 222 determines whether or not handover of the terminal 100 is needed on the basis of wireless quality of the base stations 200, 300-1, and 300-2 (Step S302). As a result of this determination, for example, when the wireless quality between the terminal 100 and the base station 200 is higher than a predetermined standard and the handover is not needed (No in Step S302), the next report information is awaited.

On the other hand, for example, it is determined that the handover is needed when the wireless quality between the terminal 100 and the base station 200 is lower than the predetermined standard, and there is a base station having the wireless quality with respect to the terminal 100 higher than the predetermined standard in the peripheral base stations 300-1 and 300-2 (Yes in Step S302). Then, the HO determination unit 222 selects, as the handover destination candidates, the base stations 300-1 and 300-2 having the wireless quality with respect to the terminal 100 higher than the predetermined standard. When the handover is needed, an HO request is generated by the HO request generation unit 223, and transmitted to the base stations 300-1 and 300-2 as the handover destination candidates via the wired I/F unit 230 (Step S303). The HO request includes, for example, identification information of the terminal 100.

After the HO request is transmitted, an HO propriety notification transmitted from the base stations 300-1 and 300-2 as the handover destination candidates is received by the wired I/F unit 230 (Step S304). This notification indicates whether each of the base stations 300-1 and 300-2 permits or rejects the handover of the terminal 100. Thus, the HO instruction generation unit 224 generates an HO instruction instructing to execute the handover by using the base station that permits the handover as the handover destination candidate. The HO instruction includes information specifying the base stations 300-1 and 300-2 as the handover destination candidates, information regarding wireless resources to be used in a case where random access process is executed with respect to the base stations 300-1 and 300-2, and the like. Then, the HO instruction is encoded and modulated by the encoding/modulation unit 225, and transmitted to the terminal 100 via the wireless communication unit 210 (Step S305).

When the terminal 100 that has received the HO instruction determines that the handover is to be executed (started), an HO destination notification is received by the wireless communication unit 210 (Step S306). The HO destination notification includes identification information of the base station 300-1 as the handover destination determined by the terminal 100 and identification information of a preamble selected by the terminal 100. These pieces of identification information are notified from the HO destination notification acquisition unit 226 to the RA advance notification generation unit 227, and the RA advance notification generation unit 227 generates an RA advance notification for notifying in advance execution of random access process by the terminal 100 (Step S307). For example, the RA advance notification including the identification information of the terminal 100 and the identification information of the preamble to be transmitted from the terminal 100 is generated and transmitted to the base station 300-1 as the handover destination via the wired I/F unit 230 (Step S308). The identification information of the terminal 100 included in the RA advance notification may be identification information (for example, C-RNTI) assigned to the terminal 100 by the base station 300-1 at the time of the HO request.

In this way, when the terminal 100 determines the base station 300-1 as the handover destination and the preamble to be transmitted to the handover destination, the base station 200 notifies in advance the base station 300-1 of the identification information of the terminal 100 and the identification information of the preamble. Thus, when the preamble is received from the terminal 100, the base station 300-1 as the handover destination may omit processing of specifying the terminal 100. As a result, the time needed for the handover of the terminal 100 may be shortened.

Figure 8:
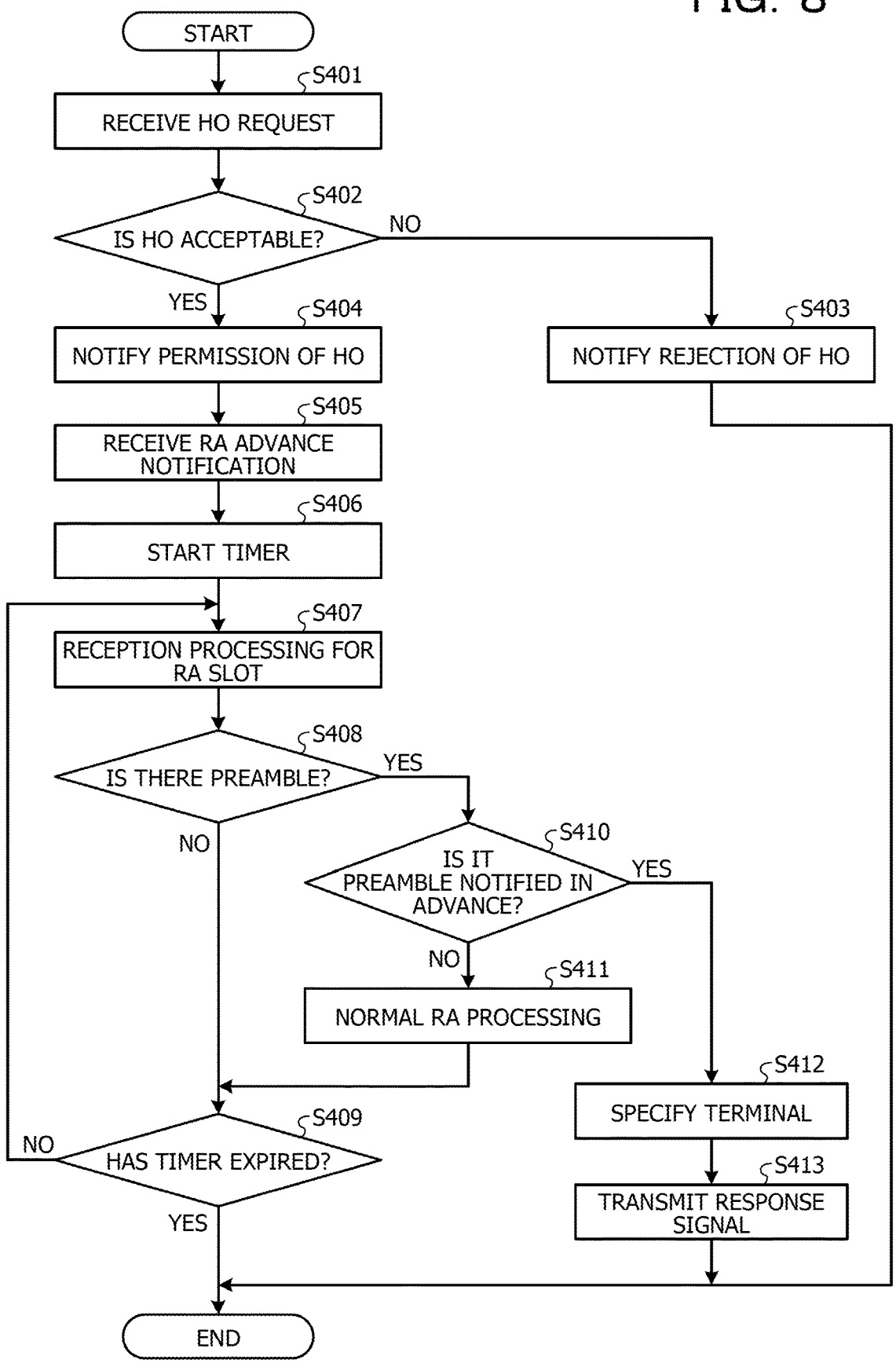
FIG. 8 is a flow diagram illustrating operation of the base station as the handover destination.

Next, operation of the base station 300-1 as the handover destination will be described with reference to a flow diagram illustrated in FIG. 8.

An HO request transmitted from the base station 200 as the handover source is received by the wired I/F unit 310 (Step S401), and is acquired by the HO request acquisition unit 321. Then, the propriety determination unit 322 determines whether or not handover of a terminal may be newly accepted (Step S402). The determination here is made based on, for example, the number of terminals already in wireless communication with the base station 300-1, and a processing load of the processor 320.

When, as a result of the determination, it is determined that the handover of the new terminal is not accepted (No in Step S402), the HO propriety notification unit 323 transmits a notification to the effect that the handover is rejected to the base station 200 via the wired I/F unit 310 (Step S403). On the other hand, when it is determined that the handover of the new terminal is accepted (Yes in Step S402), the HO propriety notification unit 323 transmits a notification to the effect that the handover is permitted to the base station 200 via the wired I/F unit 310 (Step S404). When the handover is permitted, identification information (for example, C-RNTI) given to the new terminal in a cell under jurisdiction of the base station 300-1, information regarding wireless resources to be used in random access process at the time of handover, or the like may be notified to the base station 200.

When the terminal 100 determines the base station 300-1 as the handover destination after the handover is permitted, the wired I/F unit 310 receives an RA advance notification from the base station 200 (Step S405). The RA advance notification is acquired by the RA advance notification acquisition unit 324, and identification information of the terminal 100 that performs the handover and identification information of a preamble to be transmitted from the terminal 100 are notified to the RA processing unit 326. Then, the RA processing unit 326 starts a timer for determining a timeout of reception of the preamble from the terminal 100 (Step S406).

After the timer starts, the wireless communication unit 330 and the demodulation/decoding unit 325 execute reception processing for a slot for random access process (Step S407), and the RA processing unit 326 determines whether or not the slot includes the preamble (Step S408). When the slot does not include the preamble (No in Step S408), it is determined whether or not the timer has expired (Step S409), and when the timer has expired (Yes in Step S409), the timeout of reception of the preamble from the terminal 100 occurs. For example, since the preamble notified in advance by the RA advance notification has not been received within the time, the processing ends assuming that the terminal 100 did not perform the handover.

When the slot for random access process includes the preamble (Yes in Step S408), it is determined whether or not this preamble is the preamble notified in advance by the RA advance notification (Step S410). When, as a result of this determination, the preamble is not the preamble notified in advance (No in Step S410), it is determined that the preamble has been received from a terminal different from the terminal 100, and the RA processing unit 326 executes normal random access process (Step S411). For example, a response signal to the preamble is transmitted, and processing of specifying a terminal as a transmission source of the preamble is executed.

On the other hand, when the preamble notified in advance by the RA advance notification is received (Yes in Step S410), it is specified that a transmission source of the preamble is the terminal 100 notified by the RA advance notification (Step S412). For example, the terminal 100 as the transmission source of the preamble is specified in a short time without transmitting and receiving signals to and from the transmission source of the preamble. Then, the RA processing unit 326 generates a response signal to the terminal 100, and the response signal is transmitted to the terminal 100 via the encoding/modulation unit 327 and the wireless communication unit 330 (Step S413). This response signal is a signal including information for establishing a connection with the base station 300-1, and is subjected to scramble processing unique to the terminal 100. Thus, even when the same preamble as the preamble from the terminal 100 is simultaneously received from another terminal, the response signal is not decoded by another terminal other than the terminal 100. As a result, the terminal 100 that performs the handover may establish the connection with the base station 300-1 and reliably complete the handover.

As described above, according to the present embodiment, when the terminal determines the handover destination, the preamble to be transmitted to the handover destination is selected from the shared preambles, and the information regarding the selected preamble is transmitted to the handover source. Then, the base station as the handover source notifies in advance the base station as the handover destination of the information regarding the terminal that performs the handover and the information regarding the preamble. Therefore, when receiving the preamble from the terminal that performs the handover, the base station as the handover destination may specify the terminal as the transmission source of the preamble without transmitting and receiving signals to and from the terminal. For example, the use efficiency of the preamble may be improved by not securing the individual preamble for the terminal, and the handover time may be shortened by omitting the processing of specifying the transmission source of the preamble.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station comprising:
a receiver configured to receive, from a terminal, a handover destination notification including first identification information and second identification information, the first identification information being information for identifying a first base station as a handover destination determined by the terminal, the second identification information being information for identifying a preamble to be transmitted by the terminal to the first base station; and
a transmitter configured to transmit an advance notification including third identification information and the second identification information to the first base station, the third identification information being information for identifying the terminal.

2. The base station according to claim 1, further comprising:
processor circuitry configured to determine whether or not to cause the terminal to perform handover based on wireless quality between the terminal and the base station and between the terminal and one or more base station around the base station, and
wherein the receiver receives report information reporting the wireless quality used for the determination by the processor circuitry from the terminal, and
the transmitter transmits, when the processor circuitry determines that the terminal is caused to perform the handover, a handover request that inquires whether or not it is possible to accept the handover of the terminal to the first base station among a handover destination candidate base station that wireless quality satisfies a predetermined condition.

3. The base station according to claim 1, wherein
the receiver receives a handover destination notification including wireless resource specification information that specifies wireless resources to be used for transmission of the preamble, and
the transmitter transmits an advance notification including the wireless resource specification information.

4. A base station comprising:
a receiver configured to receive, from a first base station, an advance notification including a first identification information and a second identification information, the first identification information being information for identifying the terminal, the second identification information being information for identifying a preamble to be transmitted by the terminal;
a wireless communicator configured to receive the preamble corresponding to the second identification information included in the advance notification; and
processor circuitry configured to specify that a transmission source of the preamble received by the wireless communicator is the terminal corresponding to the first identification information included in the advance notification.

5. The base station according to claim 4, wherein
the receiver receives an advance notification including wireless resource specification information that specifies wireless resources to be used for transmission of the preamble.

6. A terminal comprising:
processor circuitry configured to:
   determine, when performing a handover, a first base station as a handover destination, and
   select a preamble to transmit to the first base station; and
a transmitter configured to:
   transmit, to a second base station that is a handover source, a handover destination notification including first identification information and second identification information, the first identification information being information for identifying the determined first base station, the second identification information being information for identifying the selected preamble selected by he terminal, and
   transmit, after the transmitting the handover destination notification, the selected preamble to the first base station.

7. The terminal according to claim 6, wherein
the processor circuitry determines the first base station among from one or more base station as a handover destination candidate, the one or more base station is instructed by the second base station.

8. The terminal according to claim 6, wherein
the processor circuitry selects the preamble in a plurality of preambles used by the first base station.

9. A wireless communication system comprising:
a terminal;
a first base station configured to communicate with the terminal; and
a second base station located around the first base station, wherein
the terminal is further configured to:
   determine, when performing a handover, the second base station as a handover destination,
   select a preamble to transmit to the second base station, and
   transmit, to the first base station, a handover destination notification including first identification information and second identification information, the first identification information being information for identifying the determined second base station, the second identification information being information for identifying the selected preamble, and
   transmit, after the transmitting the handover destination notification, the selected preamble to the second base station,
the first base station is further configured to
   receive, from the terminal, the handover destination notification, and
   transmit an advance notification including third identification information and the second identification information to the second base station, the third identification information being information for identifying the terminal, and
the second base station is further configured to
   receive, from the first base station, the advance notification,
   receive the preamble corresponding to the second identification information included in the advance notification, and
   specify that a transmission source of the preamble is the terminal corresponding to the third identification information included in the advance notification.

10. The base station according to claim 1, wherein the second identification information that is transmitted from the base station to the first base station has been received by the base station from the terminal.

* * * * *